United States Patent
Okamoto et al.

(10) Patent No.: US 6,809,460 B2
(45) Date of Patent: Oct. 26, 2004

(54) POSITION CONTROL APPARATUS AND METHOD FOR TABLE MEMBER

(75) Inventors: Takuji Okamoto, Kanagawa (JP); Eiichi Yanagi, Tokyo (JP); Masaharu Suzuki, Kanagawa (JP); Yoshifumi Nishimoto, Tokyo (JP)

(73) Assignees: Canon Kabushiki Kaisha, Tokyo (JP); Canon Seiki Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/196,108

(22) Filed: Jul. 16, 2002

(65) Prior Publication Data

US 2003/0047662 A1 Mar. 13, 2003

(30) Foreign Application Priority Data

Jul. 17, 2001 (JP) ........................ 2001-216745

(51) Int. Cl.[7] .............................................. H02N 2/00
(52) U.S. Cl. ...................... 310/328; 310/12; 310/323.17
(58) Field of Search ..................... 310/12, 328, 323.17, 310/13

(56) References Cited

U.S. PATENT DOCUMENTS

| | | | | |
|---|---|---|---|---|
| 4,607,166 A | * | 8/1986 | Tamaki | ................. 250/442.11 |
| 4,693,131 A | * | 9/1987 | Teramachi | ................. 74/89.32 |
| 5,140,863 A | * | 8/1992 | Niino et al. | ............... 74/89.36 |
| 5,952,766 A | | 9/1999 | Mukohjima et al. | ... 310/323.04 |
| 6,051,911 A | | 4/2000 | Kojima et al. | .............. 310/328 |

FOREIGN PATENT DOCUMENTS

| | | | | |
|---|---|---|---|---|
| JP | 60-114441 | * | 6/1985 | ................... 82/141 |
| JP | 1-303361 | * | 12/1989 | ................. 310/328 |
| JP | 10058267 | | 3/1998 | ............ B23Q/5/34 |
| JP | 2001157473 | | 6/2001 | ............ H02N/2/00 |

* cited by examiner

*Primary Examiner*—Thomas M. Dougherty
(74) *Attorney, Agent, or Firm*—Cowan, Liebowitz & Latman

(57) ABSTRACT

There is provided a position control apparatus and method for a table member which is capable of controlling the positioning of the table through very small displacement thereof, to thereby prevent the position of the table from deviating even when a disturbance such as vibration is applied to the table. A table member is movable relative to the base member in a predetermined direction. A threaded shaft is rotatably mounted on a base member and elastically deformable when twisted. A motor is coupled to one end of the threaded shaft, for rotating the threaded shaft to displace the table member. A pressurizing and fixing member is arranged in the vicinity of a location where the motor is coupled to the threaded shaft, for pressurizing the threaded shaft to be fixed in position.

3 Claims, 6 Drawing Sheets

POSITION CONTROL APPARATUS AND METHOD FOR TABLE MEMBER

BACKGROUND OF THE INVENTION

1. Field of the Invention

The present invention relates to improvements in a position control method and apparatus using a table driven by a rotative driving device such as a motor.

2. Description of the Related Art

FIG. 5 shows a conventional position control apparatus for a table driven by a stepping motor.

Reference numeral 31 designates a table slidably moved on a base 32 via a guide section extending along an axial direction of the motor. The table 31 and the base 32 move relative to each other along an X direction in FIG. 5. The table 31 has a nut 33 fixed thereto such that it is moved together with the table 31. Fitted through the nut 33 is a threaded shaft 35 which is rotated by a stepping motor 34. The nut 33 has a threaded structure formed in an inner peripheral portion thereof, whereas the threaded shaft 35 has a threaded structure formed in an outer peripheral portion thereof. The nut 33 and the threaded shaft 35 are thus fitted together. Accordingly, the table 31 with the nut 33 fixed thereto is moved along an X axis in a direction according to the rotating direction of the threaded shaft 35. One end of the threaded shaft 35 is coupled to a rotating shaft of the stepping motor 34 by a coupling 36. A bearing 37 is fixed to the base 32 at a location intermediate between the coupling 36 and a driving part of the threaded shaft 35 fitted in the nut 33. The bearing 37 supports the threaded shaft so as to prevent the shaft from shaking in a direction orthogonal to the X direction. Thus, the position of the table is regulated in the direction orthogonal to the X axis. An index scale, not shown, provided on the base 32 is arranged opposite a main scale, not shown, provided on the table 31. A floodlight and a light receiving sensor are provided opposite the main scale via the index scale. Light emitted by the floodlight is transmitted through the index scale and then reflected by the main scale. The light is transmitted through the index scale again and then enters the light receiving sensor. By analyzing a photoelectric conversion signal from the light receiving sensor, the amount of displacement of the table can be accurately detected with high resolution.

The above described positioning apparatus for the table can surely achieve position control that meets an accuracy of the order of 0.1 μm. However, it is difficult to control positioning of the table with an increased accuracy, for example, control the positioning of the table with an accuracy of the order of 10 nm. It has been ascertained that even if the table can be stopped at a desired position, even a disturbance caused by minute vibration or the like may result in a positional deviation of 10 nm or more.

Possible causes of this phenomenon will be described below.

The apparatus that controls positioning of a table constructed as above often uses a ball screw. As shown in FIG. 5, one end of the ball screw is coupled to the stepping motor, whereas the other end is fitted in the nut integrally joined to the table. If the stepping motor is rotated through a very small angle, a response characteristic as shown in FIG. 6 is observed between a rotating force F acting upon the ball screw and rotational displacement D of the ball screw.

In FIG. 6, a point O indicates a state where both the stepping motor and the ball screw are stopped. When the stepping motor is driven in this state, the relationship between the force F and the rotational displacement D moves from the point O toward a point A along a curved characteristic line. This is because if the motor is rotated through a very small angle, then during an initial phase of rotation, the ball screw is finely twisted and thus elastically deformed, so that the rotating force is absorbed by the elastic deformation. In this state, the stepping motor having been rotated through a very small angle, one end of the ball screw coupled to the stepping motor is also rotated through a very small angle, but the part of the ball screw which is fitted in the nut is not rotated. That is, the rotational displacement D before the point A is caused by the torsional elastic deformation of the ball screw, and at this time the ball screw itself has not yet started rolling (rotation relative to the nut). When the motor is further rotated so that the force F reaches the point A, a resistance force against the elastic deformation of the ball screw increases above a rolling frictional force $F_0$ of the ball screw so that the rotating force F amounts to the frictional force $F_0$. When the motor is further rotated in this state, the ball screw starts to slide on the surface of the nut without being further elastically deformed, and thus the ball screw starts to roll. At this time, the ball screw rolls while remaining elastically deformed.

Since the ball screw has started rolling, the motor is further rotated until a point B is reached. Once the point B has been reached, the rotation of the motor is stopped. Then, in the ball screw, which has been elastically deformed, a force is generated which acts to restore the ball screw from the deformation. Even if holding current then flows to the rotor of the stepping motor, it is difficult for this current to completely resist the restoring force. Thus, the restoring force slightly rotates the rotor of the stepping motor. The rotation of the rotor causes the ball screw to be restored from the elastic deformation. The restoration gives the ball screw a tolerance for elastic deformation, that is, allows the ball screw to be elastically deformed again by the amount of restoration. If the table is subjected to a disturbance such as vibration when the ball screw has a tolerance for elastic deformation, then elastic deformation occurs within the range of tolerance so that the table is moved by the amount of deformation. If the motor is stopped before the point A is reached, the ball screw has not rolled yet but has only been elastically deformed. Thus, after the stoppage of the motor, a force to restore the ball screw from its elastic deformation is exerted. Then, the restoration gives the ball screw a tolerance for elastic deformation. This tolerance amounts to 10 nm or more. Therefore, it is difficult to control the positioning of the table with the accuracy of the order of 10 nm.

That is, if an attempt is made to control the positioning of the table with the accuracy of the order of 10 nm using the stepping motor as a driving source, the problem of hysteresis between the rotating force F acting upon the ball screw and the rotational displacement D of the ball screw is encountered.

Thus, this hysteresis, i.e. a nonlinear response must be eliminated, and screws for this purpose have been proposed. One of them is a hydrostatic screw. In this screw, a nut has a recess formed in a threaded surface thereof, and oil is filled between the nut and the screw body. With this screw, the friction between the nut and the screw body is generated only by oil viscosity resistance, and hence the frictional resistance is small, and the screw can be constructed to have high rigidity in a feed direction (thrust direction), while having no rigidity in a direction (radial direction) perpendicular to the feed direction. This prevents vertical vibration caused by bending or waviness of the screw. This hydrostatic screw may be used for all mechanical elements of the feed system. In addition to the hydrostatic screw, an aerostatic nut and the like have been proposed. However, these screws have special constructions and thus require much time and labor to fabricate, leading to high costs.

Further, an apparatus has been proposed, which has a stepping motor, a ball screw, and a piezo actuator which are coaxially arranged, as described in Japanese Laid-Open Patent Publication (Kokai) No. 10-58267. In this apparatus, the stepping motor is used to rotate the screw to drive a nut, which is fitted on the screw, in the axial direction, thereby achieving coarse adjustment driving. Further, the piezo actuator is contracted to achieve fine adjustment driving. However, naturally, this apparatus requires the arrangement of the piezo actuator as well as the stepping motor and ball screw.

SUMMARY OF THE INVENTION

It is an object of the present invention to provide a position control apparatus and method for a table member which is capable of controlling the positioning of the table through very small displacement thereof, to thereby prevent the position of the table from deviating even when a disturbance such as vibration is applied to the table.

To attain the above object, in a first aspect of the present invention, there is provided a position control apparatus comprising a base member, a table member movable relative to the base member in a predetermined direction, a threaded shaft rotatably mounted on the base member and elastically deformable when twisted, a motor coupled to one end of the threaded shaft, for rotating the threaded shaft to displace the table member, and a pressurizing and fixing member arranged in a vicinity of a location where the motor is coupled to the threaded shaft, for pressurizing the threaded shaft to be fixed in position.

To attain the above object, in a second aspect of the present invention, there is provided a position control apparatus comprising a base member, a table member movable relative to the base member in a predetermined direction, a threaded shaft rotatably mounted on the base member and elastically deformable when twisted, a motor having a rotating shaft coupled to one end of the threaded shaft, for rotating the threaded shaft to displace the table member, and pressurizing and fixing member for pressurizing the rotating shaft of the threaded shaft to be fixed in position.

In a preferred form of the second aspect, the motor and the pressurizing and fixing means are formed by a vibration wave motor.

In a further preferred form of the second aspect, the vibration wave motor comprises a moving member and a vibrating member which are in frictional contact with each other, and the rotating shaft of the motor is pressurized to be fixed in position through static friction between the moving member and the vibrating member.

To attain the above object, in a third aspect of the present invention, there is provided a position control method for controlling positioning of a table member of a position control apparatus comprising a base member, a table member movable relative to the base member in a predetermined direction, a threaded shaft rotatably mounted on the base member and elastically deformable when twisted, and a motor having a rotating shaft coupled to one end of the threaded shaft, for rotating the threaded shaft to displace the table member, the method comprising the steps of rotating the motor to elastically deform the threaded shaft by twisting the threaded shaft, rotating the motor to rotate the threaded shaft to displace the table member while keeping the threaded shaft elastically deformed, and stopping the motor to keep the threaded shaft elastically deformed.

In a preferred form of the third aspect, in the step of stopping the motor to keep the threaded shaft elastically deformed, one of the threaded shaft and the rotating shaft of the motor is pressurized to be fixed in position.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
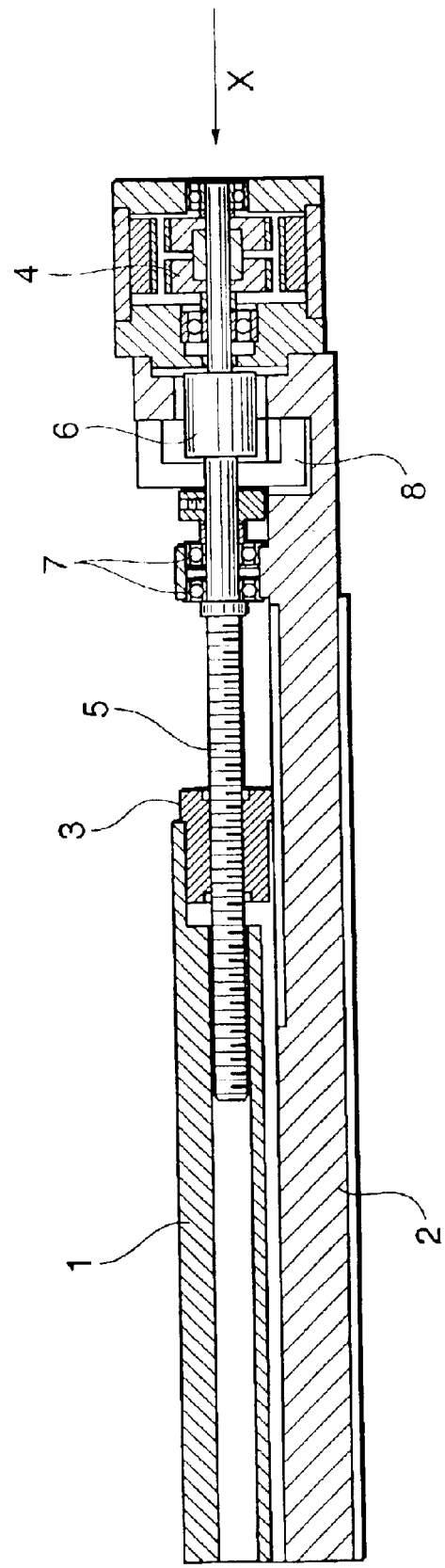
FIG. 1 is a sectional view of a position control apparatus according to a first embodiment of the present invention.
Figure 2:
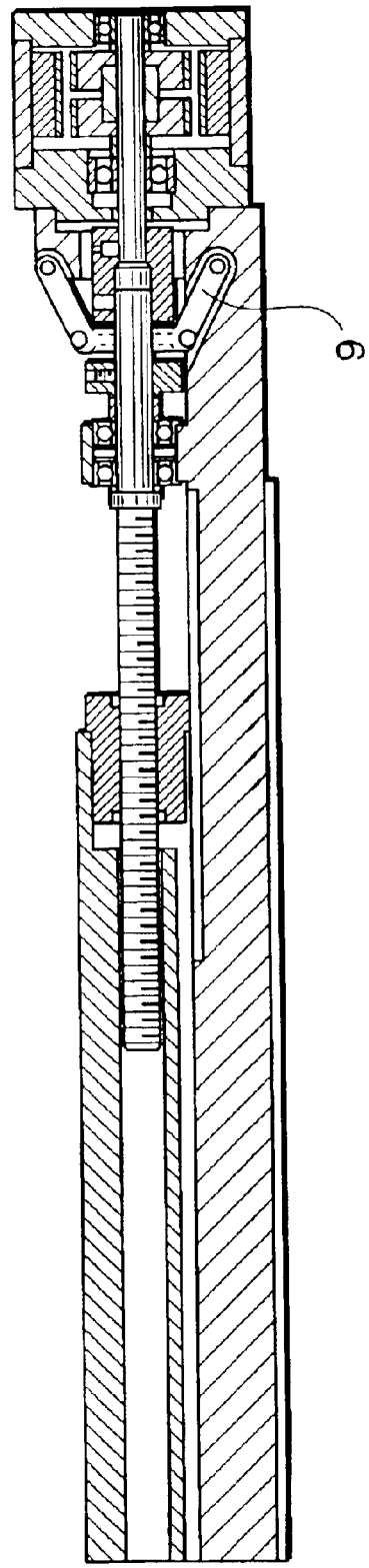
FIG. 2 is a sectional view of a position control apparatus according to a variation of the first embodiment.
Figure 5:
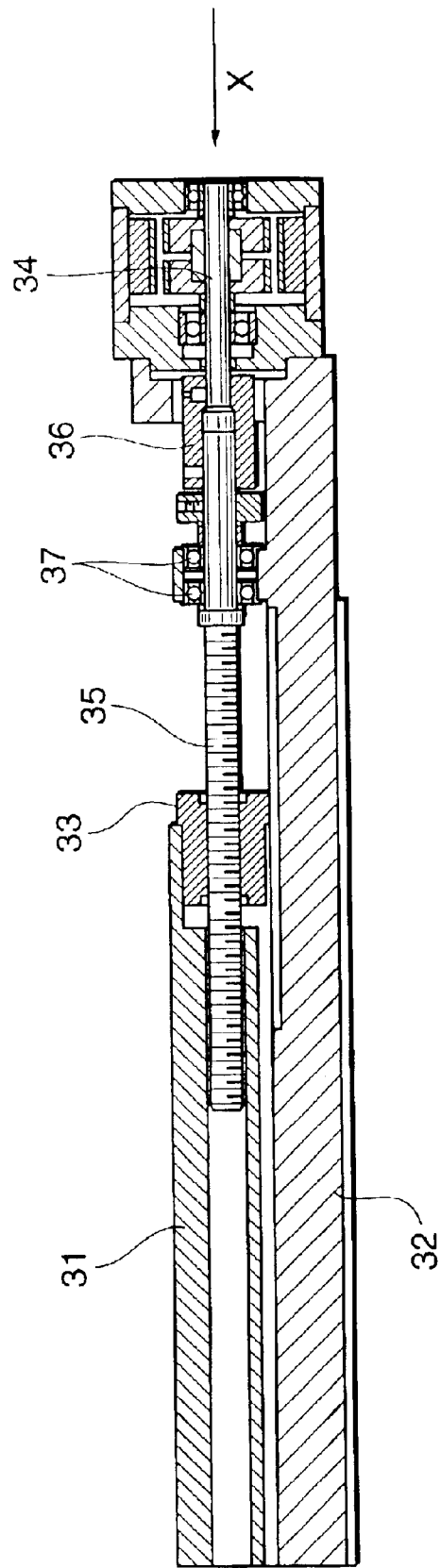
FIG. 5 is a sectional view of a conventional position control apparatus.

FIG. 1 is a sectional view showing the construction of a position control apparatus according to a first embodiment of the present invention. Reference numeral 1 designates a table which is slidably moved on a base 2 along an X axis via a guide section extending along an axial direction of a stepping motor 4. The table 1 has a nut 3 fixed thereto, and fitted through the nut 3 is a threaded shaft 5 which is rotated by the stepping motor 4. One end of the threaded shaft 5 is coupled to a rotating shaft of the motor 4 via a coupling 6. A bearing 7 is fixed to the base 2 at a location intermediate between the coupling 6 and a driving part of the threaded shaft 5 fitted in the nut 3. The arrangement described above is the same as that of the conventional position control apparatus shown in FIG. 5. The position control apparatus in FIG. 1 differs from the conventional one in that the base 2 is provided with a pressurizing and fixing member 8 that fixes in position one end of the threaded shaft 5 to which the rotating shaft of the motor 4 is coupled via the coupling. The pressurizing and fixing member 8 has a pair of arms for abutment against an outer peripheral surface of the threaded shaft 5 to inhibit the shaft 5 from rotating using a frictional force. The arms are driven in a radial direction relative to the threaded shaft 5 by a hydraulic or electromagnetic actuator, not shown, which may be a known type. The pressurizing and fixing member 8 in FIG. 1 thus has a rigid arm-like construction, but alternatively a mechanical type pressurizing and fixing member 9, shown in FIG. 2, may be used, which frictionally fixes the threaded shaft in position through contraction of a spring provided in an arm section thereof. Of course, any other mechanical type pressurizing and fixing member may be used.

Figure 6:
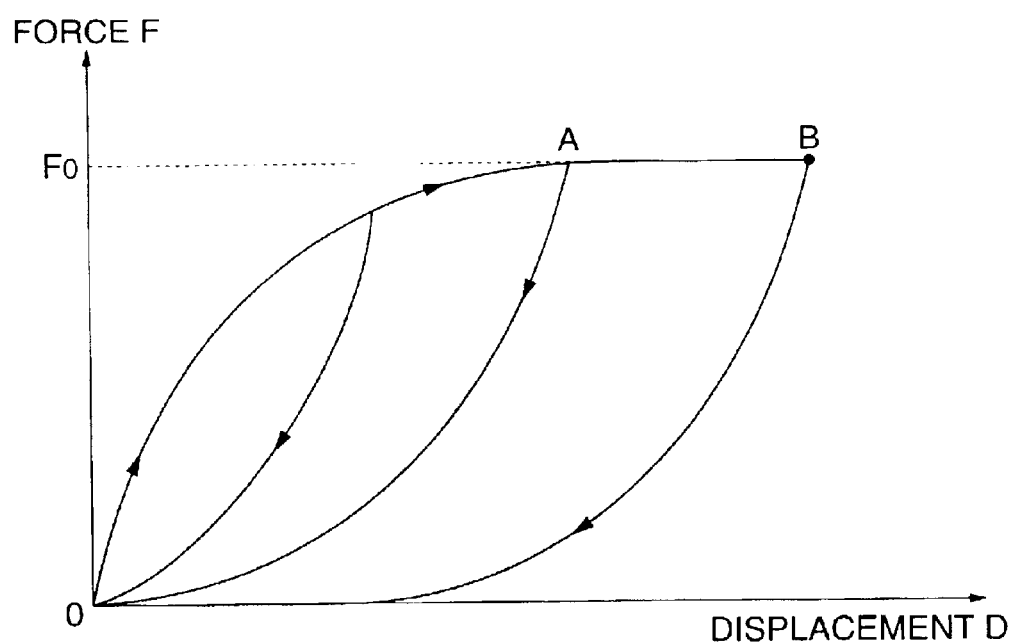
FIG. 6 is a view showing response characteristics between a force F acting upon a ball screw in a rotating direction and rotational displacement D of the ball screw.

In operation, the motor 4 is rotated to rotate the ball screw 5 and hence move the table 1 until a desired amount of displacement is obtained, while the ball screw 5 is twisted and elastically deformed. When the motor 4 is stopped, the pressurizing and fixing member 8 firmly fixes the ball screw 5 in position. When the motor 4 is stopped, the ball screw 5 tends to be restored from its elastic deformation, but it is firmly fixed in position by the pressurizing and fixing member 8 and thus kept elastically deformed. To keep the ball screw 5 elastically deformed, the pressurizing and fixing member 8 is driven before the motor 4 is stopped so that the ball screw has already been firmly fixed in position through pressurization immediately before the motor 4 is stopped. At this time, the ball screw 5 undergoes a restoring force that acts to restore the ball screw from its elastic deformation and the frictional force of the pressurizing and fixing member 8 that resists the restoring force. Thus, two balanced forces acting in opposite directions are applied to the ball screw 5. Hence, the ball screw 5 is given no tolerance for elastic deformation. Accordingly, even if the table 1 is subjected to a disturbance such as vibration, the ball screw 5 is not deformed, thus preventing positional deviation of the table 1. In the prior art, the table 1 can deviate from its correct position within the tolerance of the ball screw 5 for elastic deformation. Therefore, means should be provided to hold the ball screw 5 in a state where it is not further elastically deformed. To achieve this, according to the present embodiment, the ball screw 5 is elastically deformed to the possible maximum extent beforehand and is then fixed in position to maintain this deformation. The ball screw 5, in this state, does not exhibit response characteristics having a hysteresis as shown in FIG. 6 because it is not again elastically deformed. In FIG. 1, the pressurizing and fixing member 8 frictionally fixes the threaded shaft in position through pressurization. Alternatively, the rotating shaft of the motor 4 coupled to the threaded shaft 5 may be pressurized so as to be frictionally fixed in position.

This driving method has no problem when it is stopped midway and then driven again insofar as the motor 4 is rotated forward in the same direction. Even if the motor 4 is reversely rotated midway, the driving method has no problem insofar as a certain degree of rotational displacement is effected. The certain degree of rotational displacement refers to the amount of displacement approximately twice as large as that from point O to point A in FIG. 6. If the motor 4 is reversely rotated midway, then during initial fine displacement of the ball screw 5, the ball screw 5 is only restored from its elastic deformation. Naturally, this phenomenon of restoration occurs by an amount corresponding to the displacement from point O to point A. If the motor 4 is then further rotated in the reverse direction to cause a fine amount of displacement of the ball screw 5, the ball screw 5 starts to be elastically deformed in the reverse direction. This elastic deformation continues by an amount approximately equal to the displacement from point O to point A. That is, the ball screw 5 is only elastically deformed until the ball screw 5 is displaced by an amount approximately double the amount of displacement from point O to point A after the motor has started reverse rotation. If the motor 4 is rotated by such an amount that this amount of displacement is exceeded, the rotating force F exceeds the rolling frictional force $F_0$, whereby the ball screw 5 starts rolling (i.e. starts rotating relative to the nut 3). Therefore, the reverse rotation creates no problem provided that the motor is rotated by such an amount as to cause an amount of displacement of the ball screw 5 substantially double the amount of displacement from point O to point A.

Conversely, if the motor is rotated by such an amount as to cause an amount of displacement of the ball screw 5 smaller than substantially double the amount of displacement from point O to point A, a different driving method is required. That is, it is required that by the time the displacement smaller than substantially double the amount of displacement from point O to point A has been effected, the ball screw 5 has completed its elastical deformation with no tolerance for further elastic deformation. To achieve this, the motor 4 is rotated forward so as to cause a fine amount of displacement of the ball screw before the rotation of the motor 4 is reversed. This forward rotation of the motor 4 secures an amount of displacement approximately double or more the amount of displacement from point O to point A before the target position. The pressurizing and fixing member 8 may be formed by a disk brake or the like. Such a pressurizing and fixing member is required when an electromagnetic motor such as a stepping motor is used as a driving source for controlling the positioning of the table 1. This is because such a motor has a weak static torque.

On the other hand, if a motor having a strong static torque is used, a separate pressurizing and fixing member is not required. For example, if a vibration wave motor (ultrasonic motor) is used as a driving source for controlling the positioning of the table 1, a separate pressurizing and fixing member is not required. This is because the vibration wave motor is comprised of a rotor as a rotational moving member and a stator as a vibrating member, and the rotor and the stator are always in frictional contact with each other, so that a frictional force is exerted between the rotor and the stator even while the motor is stopped. This frictional force, i.e. static torque is generally larger than the elastic restoring force of the ball screw 5. Thus, if the motor is rotated to elastically deform the ball screw 5, the restoration of the ball screw from the elastic deformation can be resisted by simply stopping the rotation of the motor. In this state, two balanced forces, i.e. a restoring force that acts to restore the ball screw from the elastic deformation and the frictional force of the pressurizing and fixing member, which resists the restoring force, are applied to the ball screw 5. Accordingly, the ball screw is given no tolerance for elastic deformation. This, even if the table 1 is subjected to a disturbance such as vibration, the ball screw 5 is not deformed, thereby preventing the table 1 from deviating from the correct position.

In the above description, an amount of rotational displacement of the motor substantially double the amount of displacement from point O to point A is secured in order to accomplish precise position control. However, it should be understood that the amount of rotational displacement is not limited to this value. The substantially double value can be used if the the ball screw elasticity of the ball screw is substantially the same between during forward rotation of the motor and during reverse rotation thereof. However, if the value of elasticity differs between during the forward rotation and during the reverse rotation, the amount of rotational displacement to be effected may correspond to the sum of both elasticity values.

Figure 3:
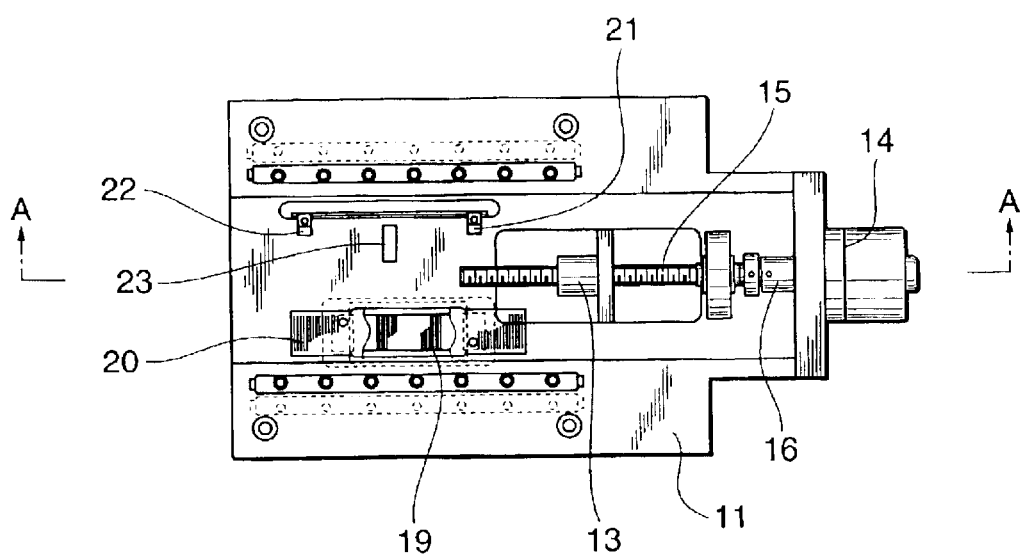
FIG. 3 is a plan view of a position control apparatus according to a second embodiment of the present invention, using a vibration wave motor as a driving source.

FIG. 3 is a plan view of a position control apparatus according to a second embodiment of the present invention, using a vibration wave motor as a driving source. Further, FIG. 4 is a sectional view of the position control apparatus as viewed from a direction A in FIG. 3.

Reference numeral 11 designates a table which is slidably moved on a base 12 via a guide section extending along an axial direction of a motor 14 which is comprised of a vibration wave motor. The table 11 has a nut 13 fixed thereto such that it is moved together with the table 11. Fitted through the nut 13 is a threaded shaft 15 which is rotated by the motor 14 which is a vibration wave motor. The table 11 with the nut 13 fixed thereto is moved along the threaded shaft 15 in a direction according to the rotating direction of the threaded shaft 15. One end of the threaded shaft 15 is coupled to a rotating shaft of the vibration wave motor 13 via a coupling 16. As stated above, the vibration wave motor 14 is comprised of a rotor and a stator which are in pressure contact with each other to provide a large static torque. Therefore, the vibration wave motor 14 is also used as the pressurizing and fixing member 8 in FIG. 1. A specific construction of this vibration wave motor as disclosed in U.S. Pat. Nos. 5,952,766, 6,051,911, and Japanese Laid-Open Patent Publication (Kokai) No. 2001-157473, for example, may be applied to the present embodiment.

A bearing 17 is provided at a location close to a side of the coupling 16 facing the nut 13 to support the threaded shaft 15 to regulate the spatial position thereof. The base 12 is provided with an index scale 19 on a surface thereof located opposite the table 11. A floodlight element and a light receiving sensor, neither of which is shown, are arranged in a space located behind the index scale and inside the base. The table 11 is provided with a main scale 20 on a surface thereof facing the base 12. Light emitted from the floodlight element provided in the base 12 is transmitted through a first lattice section of the index scale 19 to reach the main scale 20. Upon reaching the main scale 20, the light is reflected by a lattice provided on the main scale 20 and then is transmitted through a second lattice section of the index scale 19 to reach the light receiving sensor in the base 12. By analyzing a photoelectrically converted output from the light receiving sensor, the relative positions of the table 11 and base 12 can be accurately detected. Further, the table 11 is provided with a detection plate 23. When the table 11 is moved toward the motor 14 and reaches an end of a movable range of the table 11, a backward limit detector 22 provided on the base 12 detects the detection plate 23. In contrast, when the table 11 is moved away from the motor 14 and reaches an end of the movable range, a forward limit detector 21 provided on the base 12 detects the detection plate 23. Thus, the movement range of the table 11 is regulated using the backward limit detector 22, forward limit detector 21, and detection plate 23.

Figure 4:
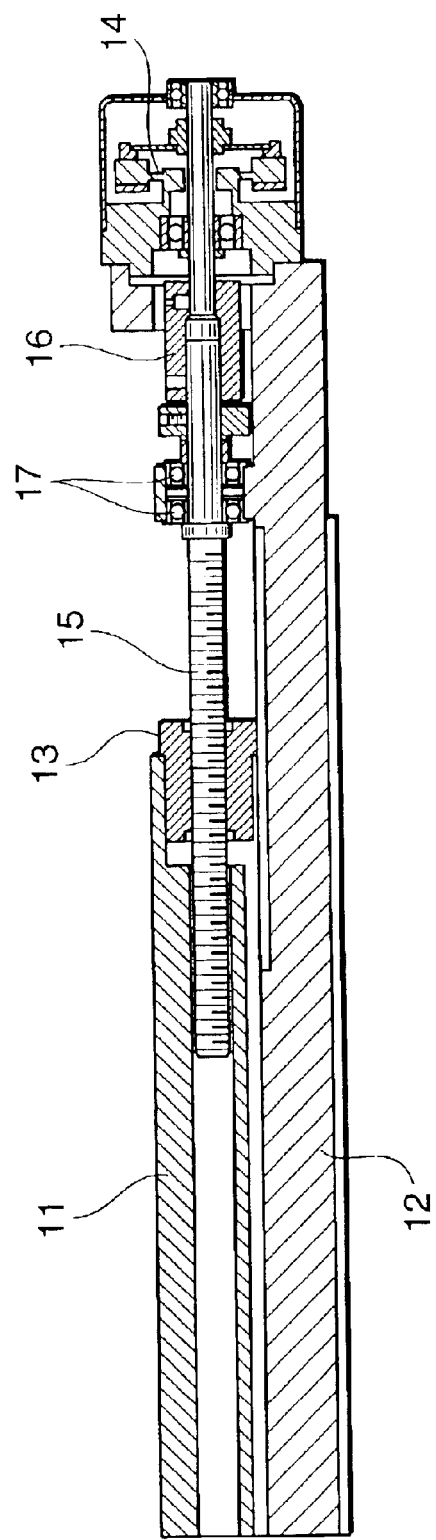
FIG. 4 is a sectional view of the position control apparatus as viewed from a direction A in FIG. 3.

The position control apparatus according to the second embodiment shown in FIGS. 3 and 4 was used to control the positioning of the table 11. The table 11 was driven from its forward limit position at a rotational speed of 20 rpm. The distance over which the table was driven was measured using a laser measuring system with a measuring potential of 1.25 nm. The results of the positioning measurements are shown in Table 1.

TABLE 1

Results of Positioning Measurements

| Measurement Number | Stop Position | |
|---|---|---|
| | Target Value 1 (690 nm) | Target Value 2 (120 nm) |
| 1 | 686 | 125 |
| 2 | 686 | 125 |
| 3 | 687 | 124 |
| 4 | 686 | 120 |
| 5 | 686 | 123 |
| 6 | 687 | 125 |
| 7 | 689 | 123 |
| 8 | 686 | 121 |
| 9 | 685 | 118 |
| 10 | 692 | 120 |
| 11 | 694 | 116 |
| 12 | 694 | 115 |
| 13 | 693 | 117 |
| 14 | 693 | 117 |
| 15 | 693 | 119 |
| σ | 3.542933947 | 3.481926123 |

A table driving operation was performed 15 times with a target value 1 set to 690 nm. The results of measurments of the distance over which the table was driven indicated that even the largest positional deviation was 5 nm and the mean deviation was 3.54. Thus,all the deviations were well below 10 nm. Further, a table driving operation was performed 15 times with a target value 2 set to 120 nm. The results of measurements of the distance indicated that the largest positional deviation was 5 nm as is the same with the target value 1 and the mean deviation was 3.48. Thus, all the deviations were well below 10 nm. Therefore, the position control apparatus according to the present invention is capable of controlling the positioning of the table with the accuracy of 10 nm or less.

As described above, the position control apparatus according to the present invention is capable of controlling the positioning of the table through very small displacement thereof, specifically, with the accuracy of 10 nm or less. This prevents the position of the table from deviating even when a disturbance such as vibration is applied to the table.

What is claimed is:

1. A position control apparatus comprising:

a base member;

a vibration wave motor having a stator, and a rotor having a rotating shaft;

a driven member movable relative to said base member in a predetermined direction; and a threaded shaft coupled to the rotating shaft of said rotor and said driven member, said threaded shaft being rotatable to move said driven member in the predetermined direction;

wherein when said driven member is to be moved, said vibration wave motor is actuated to cause said threaded shaft to be elastically deformed due to a frictional force exerted between said threaded shaft and said driven member and a rotating force of said rotor, before said threaded shaft starts to be rotated, and when said driven member is to be stopped, the rotating shaft of said rotor of said vibration wave motor is caused to be fixed in position due to a frictional force exerted between said stator and said rotor to keep said threaded shaft elastically deformed.

2. A position control apparatus according to claim 1, wherein said driven member is a table member of which an amount of displacement is optically detected.

3. A position control apparatus according to claim 1, wherein when an amount by which said driven member is required to be displaced to reach a target position is smaller than a predetermined amount, said vibration wave motor is driven to move said driven member away from the target position, and then said vibration wave motor has a rotating direction thereof changed and is driven to move said driven member to the target position.

* * * * *